United States Patent Office 3,149,092
Patented Sept. 15, 1964

3,149,092
ORGANIC POLYMERIC MATERIALS STABILIZED
WITH SUBSTITUTED HYDRAZONES
John L. Rodgers, Somerville, and Jerry P. Millionis, South
Bound Brook, N.J., assignors to American Cyanamid
Company, New York, N.Y., a corporation of Maine
No Drawing. Filed Sept. 19, 1960, Ser. No. 56,652
9 Claims. (Cl. 260—45.9)

This invention relates to a novel composition of matter comprising a polymeric organic compound containing from about 0.01% to about 10% by weight based on the total weight of said composition of a compound having the formula:

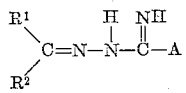

wherein A is a member selected from the group consisting of

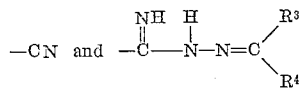

in which $R^1$ and $R^3$ are members selected from the group consisting of hydrogen and methyl; and $R^2$ and $R^4$ are members selected from the group consisting of (1) lower alkenyl radicals in which the carbon bonded to the

carries a double bond and (2) aromatic radicals of less than three rings having not more than two substituents thereon selected from the group consisting of alkyl, a lower alkoxy, halogen, nitro and dialkylamino and to the process of preparing the same.

Various benzophenones have been used as ultraviolet light absorbing agents. However many of these are not satisfactory. A good ultraviolet absorber should absorb the ultraviolet light and at the same time be a substantially colorless material which imparts little or no color to compositions in which it is used. It should be sufficiently stable to withstand the conditions of forming or curing of plastics or other carriers, and should absorb ultraviolet light sufficiently to protect the carrier composition as well as any materials being shielded therewith against yellowing or decomposition. Furthermore, the compound must have sufficient solubility in various types of materials so that it may be easily incorporated into various plastic formulations. This latter property is especially important, since an incompletely dispersed product would give poor protection.

Generally, an effective ultraviolet absorber should have its peak absorption above a wave length of 320 millimicrons. The adsorption peak may be at a higher wave length, as long as absorption drops off sufficiently as it approaches the visual range so that the absorbing compound displays little or no visible color. In addition, to be effective, the compound should show a high degree of absorbency in the desired wave length range. As a measure of the degree of absorbency, an absorption index may be used. This represents the degree of absorption of light of a selected wave length per amount of material, with a higher absorbency index indicating greater absorption. For the most desirable ultraviolet protection, the peak absorbency index should occur at wave lengths sufficiently below the visual range so that the absorbing compound has little or no yellow color.

Another method of measuring the degree of absorbency is in the molecular extinction co-efficient which is determined in exactly the same way as the absorption co-efficient except that the concentration of the material is measured in moles per liter instead of grams per liter. The extinction co-efficient is represented by the letter $\epsilon$ while the absorption co-efficient is represented by the letter $\alpha$.

Certain hydrazides of oxalimidic acid having o-hydroxyaryl radicals have been reported to be useful as metal deactivators in greases. In such a use the hydrazide chelates with the metal ions present and prevents their catalysis of the oxidative degradation. This is of course an entirely different problem from the action of ultraviolet absorbers, which preferentially absorb the ultraviolet light and disperse it as heat.

We have found that polymeric organic materials compounds can be protected from ultraviolet light by the incorporation therein of hydrazides of oxalimidic acid and of 1-cyanoformimidic acid of the general description above. These hydrazide compounds as defined above and hereinafter referred to as the hydrazides of this invention have especially desirable properties which makes them extremely useful in the method of our invention. Their peak absorptions generally lie above the wave length of 320 millimicrons and their degree of absorption is high, particularly in comparison with many of the known ultraviolet absorbers. In addition, the compounds show good light stability and a sufficient lack of color. The compounds are sufficiently soluble to be incorporated into or applied to polymeric compositions, which may include polyethylene, polypropylene, and other polyolefins, polystyrene, polyvinyl chloride, nylon, polyester resins and the like.

The hydrazides which are used as ultraviolet absorbers in the method of our invention include compounds of the formula:

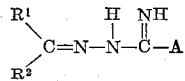

wherein A is a member selected from the group consisting of

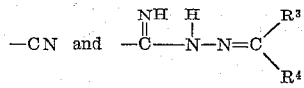

in which $R^1$ and $R^3$ are members selected from the group consisting of hydrogen and methyl; and $R^2$ and $R^4$ are members selected from the group consisting of (1) lower alkenyl radicals in which the carbon bonded to the

carries a double bond, and (2) aromatic radicals of less than three rings having substituents thereon selected from the group consisting of hydrogen, alkyl, lower alkoxy, halogen, nitro and dialkylamino. When $R^2$ and/or $R^4$ are lower alkenyl it is necessary that the carbon bonded to the

carry a double bond (i.e., this double bond must be in conjugation with the double bond to the nitrogen). When there is not such a double bond, the absorption falls off markedly and the materials are of no use in the method of our invention. Examples of lower alkenyl radicals which may be used include those of the structure

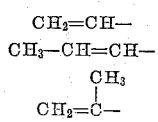

These structures are the residues of such compounds as acrolein, croton aldehyde, and methacrolein, in which the

is from the aldehyde functional group.

When $R^2$ and/or $R^4$ are an aromatic hydrocarbon residue, there is then an aromatic carbon attached to the

and thus there is still a double bond in conjugation with the double bond of the nitrogen. The aromatic radicals which may be used include phenyl, naphthyl, diphenyl, furyl, thienyl, thiazolyl, pyridyl, quinolyl and the like. These radicals may be substituted by various substituents selected from alkyl such as methyl, ethyl, propyl, butyl, octyl, lauryl and octadecyl; alkoxy, such as methoxy, ethoxy, propoxy, butoxy; bromo, chloro, fluoro, iodo, nitro, and dialkylamino. Such substituents are preferentially in the ortho or para positions to the

While many of the compounds produce good results, the compounds wherein "$R^2$" is phenyl or substituted phenyl are the preferred compounds of the invention. The phenyl group may be substituted by alkyl, alkoxy, halogen, nitro or dialkylamino, preferably in the ortho and/or para positions to the —CH= group. These are prepared from benzaldehyde and its substitution products such as 2, 3 or 4-fluoro-benzaldehydes, 2, 3 or 4-chlorobenzaldehyde, 2, 3 or 4-bromobenzaldehydes, 2,3,5 or 2,4,5-trichlorobenzaldehydes, 3,4- or 3,5-dibromobenzaldehydes, 4-iodobenzaldehyde, 4-chloro-3-iodobenzaldehyde, 2, 3 or 4-nitrobenzaldehydes, 4 - chloro - 2 - nitrobenzaldehyde, 6-chloro-3-nitrobenzaldehyde, 2,5-dichloro-3-nitrobenzaldehyde, 4-bromo-3-nitrobenzaldehyde, 4-diethylaminobenzaldehyde, 2-chloro-4-isopropylbenzaldehyde, 4-t-butylbenzaldehyde, 3-nitro-4-methylbenzaldehyde, 3-chloro-4-methylbenzaldehyde, 3,4-dimethylbenzaldehyde, 2, 3 or 4-methylbenzaldehyde, 2,4,6 - trimethylbenzaldehyde, 4-methoxybenzaldehyde, 4-butoxybenzaldehyde, 4-octyloxybenzaldehyde, and the like. The particularly preferred compounds of the invention are oxalimidic acid bis (benzylidine hydrazide) and 1-cyanoformimidic acid, benzylidine hydrazide.

In order to prepare the cyanoformimidic acid, α-methyl benzylidine hydrazides or the oxalimidic acid bis (α-methyl benzylidine hydrazides) one would use in the place of aldehydes such as those specifically set forth hereinabove such ketones as phenylmethyl ketone (acetophenone) and its substitution products such as 2, 3 or 4-fluoro phenylmethyl ketones, the 2, 3 or 4-chloro-phenylmethyl ketones, 2, 3 or 4-bromophenylmethyl ketones, 2,3,5 or 2,4,5-trichloro-phenylmethyl ketones, 3,4 or 3,5-dibromophenylmethyl ketones, 4-iodophenylmethyl ketone, 4-chloro-3-iodophenyl ketone, 2, 3 or 4-nitrophenylmethyl ketone, 4-chloro-2-nitrophenylmethyl ketone, 6-chloro-3-nitrophenylmethyl ketone, 2,5-dichloro-3-nitrophenylmethyl ketone, 4-bromo-3-nitrophenylmethyl ketone, 4-diethylaminophenylmethyl ketone, 2-chloro-4-isopropylphenylmethyl ketone, 4-t-butylphenylmethyl ketone, 3-nitro-4-methylphenylmethyl ketone, 3-chloro-4-methylphenylmethyl ketone, 3,4-dimethylphenylmethyl ketone, 2, 3 or 4-methylphenylmethyl ketones, 2,4,6-trimethylphenylmethyl ketone, 4-methoxyphenylmethyl ketone, 4-butoxyphenylmethyl ketone, 4-octyloxy phenylmethyl ketone, and the like.

The polymeric materials which may be protected by the process of our invention include, in general, any organic polymeric material with especial attention to the synthetic organic resins.

Among the tremendous array of suitable synthetic resin carrier materials capable of forming either rigid plastics or elastomers may be mentioned the acrylic resins, as exemplified by the polymers of methyl acrylate, acrylamide, methylol acrylamide, acrylonitrile, and copolymers of these with styrene, vinyl pyridines, etc.; the linear superpolyamides such as nylon; neoprene; condensates of aldehydes, especially formaldehyde and formaldehyde engendering substances such as paraformaldehyde and hexamethylene tetramine with urea, thiourea and aminotriazines such as melamine and benzoguanamine, as well as their ethers with aliphatic alcohols as exemplified by methanol and butanol; modified and unmodified condensates of hydroxybenzenes like phenol, resorcinol, etc., with the aforementioned aldehydes; silicones such as dimethyl and methyl hydrogen polysiloxanes; unsaturated, saturated and modified alkyd resins including the combinations of unsaturated polyesters with cross-linking monomers as described in detail hereinbelow; the polyolefins as for instance the polymers of ethylene, propylene, isobutylene, etc.; vinyl polymers including polyvinyl butyral and other acetals, polyvinyl chloride, polyvinyl acetate and its hydrolysis products, polyvinyl chloride-acetate, styrene and substituted styrene (especially of ring-substituted styrene, e.g., o-, m- and p-methyl styrene) polymers and copolymers with acrylonitrile and other terminal ethylenic monomers as mentioned hereinbelow; copolymers of vinylidene chloride with vinyl chloride; cellulose ethers as exemplified by ethyl and methyl cellulose; cellulose esters including the nitrate, acetate, propionate, etc.; regenerated cellulose; fluorocarbon polymers such as polytetrafluoroethylene and polytrifluorochlorethylene; rubber hydrochloride; chlorinated rubber; polyethylene glycol and polypropylene glycol; epoxy resins as exemplified by the condensates of epichlorohydrin with bis-phenol, diphenylol propane, etc.; polyurethane or isocyanate resins, as well as copolymers and simple mixtures of homo- and copolymers of any two or more such materials. Additionally, such polymeric materials as polyoxymethylene, polyvinyl fluoride, copolymers of vinyl fluoride and vinyl acetate, polycarbonates, polyvinyl butyral, cellulose acetatebutyrate, copolymers of olefins and mixtures of polyolefins, polyureas and the like may be used. This list is not meant to be limiting or exhaustive but merely to illustrate the wide range of polymeric carriers which may be employed in the present invention, as the vast majority of synthetic resins are suitable for the purpose provided that they do not react with the hydrazides disclosed herein and provided that there is a suitable means for molecularly dispersing said hydrazide therein.

The preparation, shaping, curing, extrusion, calendering, casting, molding or other forming of these resins is well understood by those skilled in the art and accordingly need not be detailed here. Likewise, the formulation of such resins with various additives including catalysts, promoters, plasticizers, fillers, reinforcing agents like textile glass fibers and fabrics, colorants including pigments and dyes, mold lubricants, flow promoters, inhibitors to promote storage life, thickeners, fire retardant agents and other conventional additives is well known and need not be set forth here.

Outstanding results are obtained with certain of the above resins, and since these are frequently employed out of doors, they constitute the preferred species: namely super polyamides, polyethylene, polypropylene, flexible and rigid polyvinyl chloride compositions, polyvinyl butyral, polystyrene, and copolymerizable mixtures of an unsaturated linear polyester with a terminal ethylenic monomer. The method of this invention includes the incorporation of the hydrazides in the cured infusible polymeric products as well as placing them in the polymerizable thermosetting formulations from which they are then prepared. The hydrazides used in our invention are free of acidic hydrogens and consequently are of especial value in superpolyamides and other basic resins and base-cured resins, where the acidic nature of older UV absorbers has proved detrimental.

For most purposes the compositions of this invention may desirably contain between about 0.01% and about 10% of the selected hydrazide based on the total weight of solids in the final product. In general, the preferred usage lies in the range 0.05 to 1% for most uses.

These agents may be introduced into the polymeric materials in various ways, chiefly depending on the nature of the carrier material, in order to procure a molecular dispersion of the hydrazide compound in the final composition. Thus, in the case of many vinyl compounds, like polyvinyl chloride, they may be dissolved in the plasticizer first and introduced into the resin formulation in that solution. In the case of polyethylene, the hydrazide compound may be introduced as a powder or granules and thoroughly dissolved in the polymer upon milling at an elevated temperature.

In many other molding compounds, as for instance, those containing urea-formaldehyde condensates, the powdered ultraviolet absorber is merely thoroughy mixed into the molding composition and dissolves therein during the molding operation wherein the urea resin fuses before curing.

Where an aqueous solution or dispersion of a resin like melamine-formaldehyde is employed for impregnating paper, textile, etc., the hydrazide compound may be first dissolved in a relative small amount of a suitable organic solvent and thereafter dispersed in the aqueous medium with an emulsifying agent as described earlier.

The absorber may be dissolved in alkaline cellulose xanthane dope prior to regenerating the dope in an acidic bath in the form of filaments or sheets with the hydrazide molecularly distributed therethrough. In addition, when intended for use with carriers which form a coating or film by drying, the UV absorbing compound may be introduced into the liquid carrier in solution or emulsion in a liquid compatible with the liquid carrier formulation and the solvent or emulsifying medium evaporated under the selected drying conditions. In some instances it may be desirable to introduce the hydrazide as a solid, or in solution or emulsion along with unsaturated polymerizable monomeric materials and polymerize the mass to form the desired dispersion in a thermoplastic carrier and the hydrazide may be similarly introduced when preparing a fusible thermosetting resin precondensate as the carrier in order to obtain the necessary molecular dispersion in the final article.

In the preparation of unsaturated polyester resins useful as carriers in the present invention, one may use the alpha-beta unsaturated polycarboxylic acids such as maleic, fumaric, aconitic, itaconic, monochloro maleic anhydride and the like. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to use saturated polycarboxylic acids, also, that is, those which are free of nonbenzenoid unsaturation, one could use such acids as phthalic, malonic, succinic, glutaric, sebacic and chlorinated polycarboxylic acids such as tetrachlorophthalic anhydride, hexachloroendo-methylene tetrahydrophthalic acid and the like but in amounts less than a larger proportion of the total amount of polycarboxylic acid present. Whenever available, the anhydrides of these acids may be substituted therefor in whole or in part.

As polyhydric alcohols which may be used to prepare the unsaturated polyesters of the present invention it is preferred to employ those alcohols having only two hydroxy groups, optionally with minor amounts of alcohols having three or more hydroxy groups. Among the suitable alcohols are ethylene glycol, diethylene glycol, propylene glycol, dipropylene glycol, butanediol-1,4-butanediol-1,3, butanediol-1,2, pentanediol-1,2, pentanediol-1,3, pentanediol-1,4, pentanediol-1,5, hexanediol-1,6 and the like, also glycerol pentaerythritol, dipentaerythritol and the like.

The unsaturated linear alkyd component may be formed in conventional manner by reacting one or more of these polycarboxylic acids with one or more of the polyhydric alcohols to produce material having an acid number below about 55, and desirably between about 35 and 40.

The cross-linking monomer for the polyester resin is a polymerizable material having a $CH_2=C<$ group and desirably boiling about 60° C. Amongst these polymerizable compounds are styrene, side chain substituted styrenes such as the alpha-methylstyrene, alpha-ethylstyrene and the like or ring-substituted styrene such as ortho, meta and para-alkyl styrenes such as o-methylstyrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethyallyl phosphate, tetraallyl silane, tetrallyl silicate, hexallyl disiloxane and the like.

Many examples of the preparation, use and suitable additives for such unsaturated polyester resins formulation are known in the art.

The two principal generic classes of compounds which are used in the present invention are represented by the structural formula:

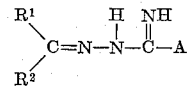

in which A is

—CN or

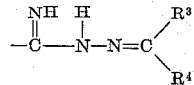

and are either 1-cyanoformimidic acid alkylidenehydrazides, 1-cyanoformimidic acid aralkylidenehydrazides, oxalimidic acid bis-(alkylidenehydrazides) or oxalimidic acid bis-(aralkylidenehydrazides). In the preparation of the former class of compounds cyanogen is reacted with one mole of hydrazine to form a cyanoformimidic acid hydrazone. Said cyanoformimidic hydrazone is then reacted with a one mole of a selected aromatic aldehyde or ketone as has been indicated hereinabove to yield a cyanoformimidic acid alkylidenehydrazide. In the preparation of the oxalimidic acid bis-(alkylidenehydrazides), cyanogen is reacted with two moles of hydrazine to form an oxamide dihydrazone. This oxamide dihydrazone is then reacted with two moles of an aromatic aldehyde or ketone such as those set forth hereinabove to produce an oxalimidic acid bis-(alkylidenehydrazide).

This application is a continuation-in-part of Serial No. 786,710, filed January 14, 1959, now abandoned.

Our invention can be illustrated by the following examples in which parts are by weight unless otherwise specified.

EXAMPLE 1

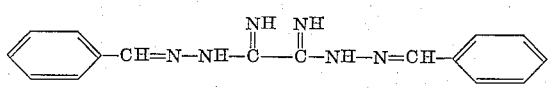

53 grams of benzaldehyde is dissolved in about 2 liters of ethanol, 29 grams of oxamide dihydrazone is added, and the mixture heated on the steam bath for a short time with occasional stirring. As the oxamide dihydrazone goes into solution, the product oxalimidic acid bis-(benzylidene hydrazide) precipitates as yellow, shiny plates. The mixture is cooled and the product isolated by filtration.

EXAMPLE 2

By using the procedure of Example 1, various other oxalimidic acid bis-(alkylidene hydrazides) are prepared from oxamide dihydrazone and the appropriate aldehyde or ketone. In the following table are shown the characteristics of these compounds (and also of the compound prepared in Example 1) in respect to their absorption maxima along with their absorption indexes and extinction coefficients.

The first compound on the list, oxalimidic acid bis-(isopropylidene hydrazide), has been included for purposes of comparison, indicating the poor absorption characteristics of compounds of this type which do not contain a conjugated double bond in the alkylidene radical. The benzophenones listed at the end are presently available commercial UV absorbers.

$N,N''$-Bis-(Aralkylideneamino)-Oxamidines (Oxalimidic Acids)

$$R=N-N-\overset{NH}{\underset{H}{\overset{\|}{C}}}-\overset{NH}{\underset{H}{\overset{\|}{C}}}-N-N=R$$

| R | λ max. | α | ε [1] |
|---|---|---|---|
| (CH₃)₂C= | Below 300 | [3] 25.2 | [3] 4,900 |
| Cl-⌬-CH= | 342 | 103.6 | 37,500 |
| ⌬-CH= | 335 | 132.8 | 38,800 |
| CH₃O-⌬-CH= | 345 | 133.7 | [2] 47,000 |
| Cl-⌬(Cl)-CH= | 348 | 95.1 | 40,800 |
| ⌬(OCH₃)-CH= | 350 | 115.1 | 40,500 |
| ⌬-CH=CH-C(CH₃)= | 362 | 147.0 | 54,700 |
| ⌬-CH=CH-CH= | 365 | 177.2 | 60,800 |
| CH₃-⌬-CH= | 335 | 122.9 | 39,400 |
| NO₂-⌬-CH= | 340 | 34.7 | [2] 13,300 |
| ⌬-C(CH₃)= | 330 | 99.1 | 31,800 |
| ⌬⌬-CH= | 365 | 103.2 | 40,500 |
| (CH₃)₂N-⌬-CH= | 385 | 150.9 | [2] 57,000 |
| (CH₃)₂CH-⌬-CH= | 340 | 115.5 | 43,500 |
| N⌬-CH= | 335 | 103.2 | [2] 30,300 |
| (quinoline)-CH= | 335 | 117.4 | [2] 34,600 |
| CH₃-CH=CH-CH= | 315 | 150.9 | [2] 33,200 |
| 2-hydroxy-4-methoxy-benzophenone | 328 | 40 | 9,100 |
| 2,2'-dihydroxy-4-methoxy-benzophenone | 354 | 54.3 | 13,300 |
| 2,2'-dihydroxy-4,4'-dimethoxy-benzophenone | 357 | 72.0 | 19,700 |

[1] Solvent=toluene.
[2] Solvent=toluene+about 1% DMF.
[3] Determined at 320 mμ.

In order to illustrate a process for the preparation of a number of the class of compounds identified generically as 1-cyanoformimidic acid, aralkylidenehydraizdes, the following examples are set forth in which all parts are parts by weight unless otherwise indicated.

EXAMPLE 3

To 4.2 parts (0.05 mole) of 1-cyanoformimidic acid hydrazide dissolved in 50 parts of ethanol and to this solution, there is added 7.8 parts (0.05 mole) of 1-naphthaldehyde dissolved in 50 parts of alcohol. In five minutes a heavy precipitate separates and is collected by filtration. The product produced is recrystallized from alcohol. The product produced is 1-cyanoformimidic acid naphthylidenehydrazide.

Other compounds of this class which may be prepared and used in keeping with the concept of the present invention are: 1-cyanoformimidic acid, benzylidenehydrazide; 1-cyanoformimidic acid, p-methylbenzylidenehydrazide; 1-cyanoformimidic acid, p-chlorobenzylidenehydrazide; 1-cyanoformimidic acid, 2,4-dichlorobenzylidenehydrazide; 1-cyanoformimidic acid, p-methoxybenezylidenehydrazide; 1-cyanoformimidic acid, p-butoxybenzylidenehydrazide; 1-cyanoformimidic acid, p-nitrobenzylidenehydrazide; 1-cyanoformimidic acid, p-isopropylbenzylidenehydrazide; 1-cyanoformimidic acid, p-dimethylaminobenzylidenehydrazide.

EXAMPLE 4

Example 3 is repeated in all details except that in the place of 1-naphthaldehyde there was substituted benzaldehyde in equivalent amounts and the resultant product was 1-cyanoformimidic acid, benzylidenehydrazide. The ultraviolet analysis of this compound showed the following: $\alpha_{max}=123.7$ at 310 mμ.

EXAMPLE 5

Example 3 is repeated in all details except that in the place of the 1-naphthaldehyde there was substituted an equivalent amount of acetophenone. The ultimate product produced was 1-cyanoformimidic acid, α-methylbenzylidenehydrazide. The ultraviolet absorption analysis of this compound showed the following: $\alpha_{max}=93.6$ at 305 mμ.

EXAMPLE 6

Example 3 is repeated in all details except in the place of 1-naphthaldehyde there is substituted an equivalent amount of p-isopropylbenzaldehyde. The resulting product was 1-cyanoformimidic acid, p-isopropylbenzylidenehydrazide. The ultraviolet absorption analysis of this compound showed the following: $\alpha_{max}=126$ at 313 mμ.

EXAMPLE 7

Example 3 is repeated in all details except in the place of 1-naphthaldehyde there is substituted an equivalent amount of p-chlorobenzaldehyde. The resulting product was identified as 1-cyanoformimidic acid, p-chlorobenzylidenehydrazide. The ultraviolet absorption analysis of this compound showed the following: $\alpha_{max}=125.2$ at 315 m$\mu$.

EXAMPLE 8

Example 3 is repeated in every detail except that in the place of 1-naphthaldehyde there is substituted an equivalent amount of 2,4-dichlorobenzaldehyde. The resulting product was identified as 1-cyanoformimidic acid, 2,4-dichlorobenzylidenehydrazide. The ultraviolet analysis of this compound was determined to be as follows: $\alpha_{max}=99.1$ at 315 m$\mu$.

EXAMPLE 9

Example 3 is repeated in all details except that in the place of the 1-naphthaldehyde there is substituted an equivalent amount of p-methoxybenzaldehyde. The resulting product was identified as 1-cyanoformimidic acid, p-methoxybenzylidenehydrazide. The ultraviolet absorption analysis of this compound was determined to be as follows: $\alpha_{max}=145.6$ at 325 m$\mu$.

EXAMPLE 10

Example 3 is repeated in every detail except that in the place of the 1-naphthaldehyde there is substituted an equivalent amount of p-methylbenzaldehyde. The resulting product was identified as 1-cyanoformimidic acid, p-methylbenzylidenehydrazide. The ultraviolet absorption analysis of this compound was determined as follows: $\alpha_{max}=120.1$ at 310 m$\mu$.

EXAMPLE 11

Example 3 is repeated in every detail except in the place of 1-naphthaldehyde there is substituted an equivalent amount of p-dimethylaminobenzaldehyde. The resulting product is identified as 1-cyanoformimidic acid, p-dimethylaminobenzylidenehydrazide. The ultraviolet absorption analysis of this compound showed the following: $\alpha_{max}=163.8$ at 318 m$\mu$.

EXAMPLE 12

Example 3 is repeated in all details except in the place of 1-naphthaldehyde there is substituted an equivalent amount of p-nitrobenzaldehyde. The ultraviolet absorption analysis of this compound showed the following: $\alpha_{max}=93.9$ at 335 m$\mu$.

EXAMPLE 13

Example 3 is repeated in every detail except in the place of 1-naphthaldehyde there is substituted an equivalent amount of 1-(p-methoxy) naphthaldehyde. The resulting product produced was identified as 1-cyanoformimidic acid, 1-(p-methoxy) naphthylidenehydrazide. The ultraviolet absorption analysis of this compound showed the following: $\alpha_{max}=91.0$ at 360 m$\mu$.

In either of these two parallel reaction systems of preparation, if the aromatic aldehyde or ketone utilized has an orthohydroxy substituent on the ring such as would be found in salicylaldehyde, 5-chlorosalicylaldehyde, 3,5-dichlorosalicyaldehyde and the like the ultimate 1-cyanoformimidic acid aralkylidenehydrazide or the oxalimidic acid bis-(aralkylidenehydrazide) displays one outstanding shortcoming, namely transitory effectiveness. By transitory effectiveness is meant that the percent of the ultraviolet absorber remaining in a film of a polymeric organic material after having been exposed in a Fade-Ometer for a period of time such as 100 hours is significantly diminished. If the absorber tends to diminish significantly in percentage present in the film, it is deemed to be a transitory absorber and therefore undesirable for most practical purposes. To illustrate the superior light stability of the hydrazides of this invention, a plurality of the ultraviolet absorbers of the present invention and certain analogous materials but those outside of the present invention inasmuch as they contain an ortho-hydroxy group as a substituent on the aromatic ring are dissolved in acetone and mixed with a cellulose acetate-acetone solution. A glass microslide is dipped in this solution and a thin film formed on the glass as the solvent evaporated. Duplicate samples are obtained by carefully stripping the film from one side of the slide. This film is taped to a metal Fade-Ometer mount. The absorption curve of this film is then taken versus air. The glass slide itself serves as the mount for the remaining film. The curve of the film and the glass slide is taken versus a glass slide. These films are exposed in a Fade-Ometer for 100 hours and the amount of absorber remaining is determined spectrophotometrically. Results obtained using compounds represented by the following structural formula are shown in Table I.

$$\text{Ar}-\overset{H}{\underset{|}{C}}=N-\overset{H}{\underset{|}{N}}-\overset{NH}{\underset{||}{C}}-\overset{NH}{\underset{||}{C}}-\overset{H}{\underset{|}{N}}-N=\overset{H}{\underset{|}{C}}-\text{Ar}$$

TABLE I $$\left[\text{Ar}-\text{CH}=N-\text{NH}-\overset{NH}{\underset{||}{C}}-\right]_2$$

| Ar | Percent Remaining After 100 Hrs. |
|---|---|
| 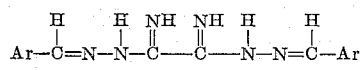 | 77 |
| 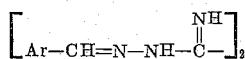 (OH) | 5 |
| 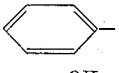 (OH) | 10 |
| 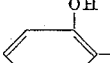 (OCH) | 50 |
| Cl-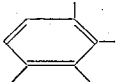- | 67 |
| CH$_3$-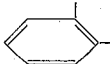- | 69 |
| (CH$_3$)$_2$CH-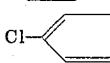- | 58 |
| HO-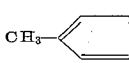- (OH) | 9 |

Results obtained using compounds represented by the following structural formula are shown in Table II:

$$\underset{R}{\bigcirc}-\text{CH}=N-\text{NH}-\overset{NH}{\underset{||}{C}}-\text{CN}$$

TABLE II $$\underset{R}{\bigcirc}-\text{CH}=N-\underset{H}{\overset{|}{N}}-\overset{NH}{\underset{||}{C}}-\text{CN}$$

| Ex. | R | Percent Remaining/ 100 Hours |
|---|---|---|
| 3 | 1-Naphthylidene | 72 |
| 4 | H | 86 |
| 6 | p-Isopropyl | 94 |
| 7 | p-Chloro | 96 |
| 8 | 2,4-Dichloro | 96 |
| 9 | p-Methoxy | 91 |
| 10 | p-Methyl | 88 |
| 11 | p-Dimethylamino | 47 |
| 12 | p-Nitro | 77 |
| 13 | 4-Methoxy-1-naphthylidene | 53 |
|  | o-Hydroxy | 5 |

From this it can be seen that the ultraviolet light absorbers of the present invention display a substantially permanent residence time in a polymeric organic material when exposed to ultraviolet light.

EXAMPLE 14

A 5.13 gram sample of nylon piece goods is placed in 400 ml. of water which is then heated to 75° C. Part of a solution of 0.0513 gram (1% on weight of fiber) of oxalimidic acid bis-(benzylidene-hydrazide) in about 30 ml. of alcohol is added to the hot water. The bath is then raised to 89° C., and all the remaining alcoholic solution slowly added. After one hour, the nylon is rinsed with water several times. Analysis of the nylon indicates a 0.2% dyeing. After 500 hours' exposure in a Fade-Ometer, tensile strength is 34 p.s.i. as compared to 28 p.s.i. for a control sample.

EXAMPLE 15

A plasticized polyvinyl chloride composition is prepared according to the formula: 100 parts polyvinyl chloride, 50 parts di-2-ethylhexylphthalate, 2 parts barium-cadmium laurate and 1 part triarylphosphite. In addition, 0.1 part of oxalimidic acid bis-(benzylidene hydrazide) per hundred parts resin is added to one sample and 0.2 part to another. The three compositions are milled and molded in a standard way, with the samples pressed to a 10 mill thickness. After 500 hours of exposure in the Fade-Ometer, the sample containing 0.2 part of oxalimidic acid bis-(benzylidene-hydrazide) develops no brown spots and the sample containing 0.1 part develops one, while the control sample containing no ultraviolet absorber develops 44 to 50 spots.

EXAMPLE 16

Oxalimidic acid bis-(benzlyidenehydrazine) is milled into polystyrene at 0.2% concentration. The initial color is slightly yellow but after 400 hours in a Fade-Ometer, the color has not changed. A control sample under the same treatment changes from water-white to yellow.

EXAMPLE 17

Oxalimidic acid bis-(benzylidenehydrazide) is dissolved in acetone and mixed with a cellulose acetate-acetone solution. A glass microslide is dipped in this solution and allowed to dry, thus forming thin films of cellulose acetate containing the ultraviolet absorber. Exposure of these films in a Fade-Ometer shows an average of 77% of the oxalimidic acid bis-(benzylidenehydrazide) remaining after 100 hours.

EXAMPLE 18

By using a procedure similar to that described in Example 17, but substituting an alcohol solution of Zytel nylon for the cellulose acetate-acetone solution, films of Zytel 61 nylon containing oxalimidic acid bis-(benzylidenehydrazide) are prepared and tested for light stability of the ultraviolet absorber. 82% of the compound remains after 100 hours' exposure in the Fade-Ometer.

EXAMPLE 19

Five percent on weight of the fabric of a 1-cyanoformimidic acid, aralkylidenehydrazide was applied to nylon taffeta by exhaustion. The exhaustion was carried out using a 30:1 liquor to cloth ratio. The bath was prepared with water only, and the fabric entered. The temperature was raised slowly to the boil, with constant stirring, and at this temperature the hydrazide was slowly added over a 30-minute period from a solution in a small quantity of ethanol. When all the hydrazide was added, exhaustion was continued for a further 60 minutes at the boil, with continuous stirring. The fabric was then removed, rinsed thoroughly and dried.

The treated fabric, along with a control, was exposed for 80 hours in a Weather-Ometer (dry) and/or Fade-Ometer and the percent tensile strength loss was determined.

| Hydrazide Used | Percent Tensile Strength Loss | |
|---|---|---|
| | Weather-Ometer | Fade-Ometer |
| Control (none) | 83 | 85 |
| Benzylidene | 36 | 40 |
| p-Chlorobenzylidene | | 31 |

EXAMPLE 20

*Stabilization of Polyester*

Samples of 1-cyanoformimidic acid, aralkylidenehydrazides were incorporated into a polyester resin, the resin samples with controls then being exposed in a Weather-Ometer. The hydrazide derivatives increased the stability of the polyester resin as shown by a decrease in the degree of yellowing on exposure as measured spectrophotometrically. This is carried out by the procedure described.

A polyester resin is prepared according to the following formula:

| | Parts |
|---|---|
| Polyester resin [1] | 95 |
| Styrene monomer | 5 |
| Benzoyl peroxide [1] | 0.5 |
| Hydrazide derivatives | 0.25 |

[1] A commercially available polyester resin composition comprising 28 parts of monomeric styrene and 72 parts of the polyester resulting from the reaction of 6.6 mols of propylene glycol, 3 moles of phthalic anhydride and 3 mols of maleic anhydride.

The hydrazide is dissolved in the monomeric styrene. The benzoyl peroxide is added with thorough mixing and the polyester resin is finally added, the final solution being stirred for three one-minute periods. The solution is then cured in a glass "sandwich" (between two glass plates), the curing cycle consisting in heating at 80° C. for 30 minutes, 105° C. for 30 minutes and finally at 120° C. for 60 minutes. The samples are then removed from the sandwich and allowed to cool at room temperature and are then exposed, along with control samples containing no hydrazide, for 100 hours in an Atlas Weather-Ometer (rain cycle 18 minutes, no rain 102 minutes).

A slight yellow color was imparted to the resin samples by the hydrazides incorporated therein. After exposure in the Atlas Weather-Ometer, the samples containing the hydrazides showed very little change in color whereas the two control samples containing no hydrazide became a very pronounced yellow color. The degree of color change may be expressed numerically by the change in yellow factor based on reflectance measurements of the samples made on a recording spectrophotometer, the yellow factor being expressed as follows:

Yellow factor $$= \frac{\text{Percent } R \text{ (at 650 millimicrons) Minus Percent } R \text{ (at 430 millimicrons)}}{1.57 [\text{Percent } R \text{ (at 550 millimicrons)}]}$$

$R$ = reflectance

| Hydrazide Used in Polyester Sample | Change in Yellow Factor After 100 Hours' Weather-Ometer Exposure |
|---|---|
| None, Control A | 20.9 |
| None, Control B | 21.6 |
| 1-cyanoformimidic acid, benzylidene-hydrazide, 0.25% | 3.1 |
| 1-cyanoformimidic acid, 1-napthylene-hydrazide, 0.25% | 0.5 |

We claim:

1. A composition of matter comprising a polymeric organic material selected from the group consisting of a vinyl chloride polymer, a cellulosic, a polystyrene, a polyamide and a polyester containing from about 0.01% to 10% by weight based on the total weight of said compositions of a compound having the formula:

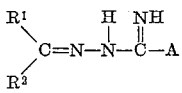

wherein A is a member selected from the group consisting of

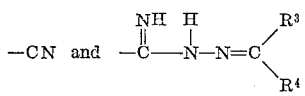

in which $R^1$ and $R^3$ are members selected from the group consisting of hydrogen and methyl; and $R^2$ and $R^4$ are members selected from the group consisting of lower alkenyl radicals in which the carbon bonded to the

carries a double bond, and aromatic radicals having no more than the two substituents thereon, said substituents being selected from the group consisting of alkyl, a lower alkoxy, halogen, nitro and dialkylamino.

2. A composition of matter comprising a polymeric organic material selected from the group consisting of a vinyl chloride polymer, a cellulosic, a polystyrene, a polyamide and a polyester containing from about 0.05% to 5% by weight based on the total weight of said composition of a compound having the formula:

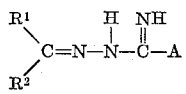

wherein A is a member selected from the group consisting of

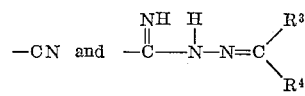

in which $R^1$ and $R^3$ are members selected from the group consisting of hydrogen and methyl; and $R^2$ and $R^4$ are members selected from the group consisting of lower alkenyl radicals in which the carbon bonded to the

carries a double bond, and aromatic radicals having no more than the two substituents thereon, said substituents being selected from the group consisting of alkyl, alkoxy, halogen, nitro and dialkylamino.

3. A composition of matter comprising a polymeric organic material selected from the group consisting of a vinyl chloride polymer, a cellulosic, a polystyrene, a polyamide and a polyester containing from about 0.01% to 10% by weight based on the total weight of said material of oxalimidic acid, bis(benzylidene hydrazide).

4. A composition of matter comprising a polymeric organic material selected from the group consisting of a vinyl chloride polymer, a cellulosic, a polystyrene, a polyamide and a polyester containing from about 0.01% to 10% by weight based on the total weight of said material of oxalimidic acid, bis(p-chlorobenzylidene hydrazide).

5. A composition of matter comprising a polymeric organic material selected from the group consisting of a vinyl chloride polymer, a cellulosic, a polystyrene, a polyamide and a polyester containing from about 0.01% to 10% by weight based on the total weight of said material of oxalimidic acid, bis(p-methylbenzylidene hydrazide).

6. A composition of matter comprising a polymeric organic material selected from the group consisting of a vinyl chloride polymer, a cellulosic, a polystyrene, a polyamide and a polyester containing from about 0.01% to 10% by weight based on the total weight of said material of a compound having the formula:

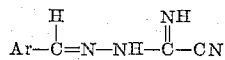

in which Ar is a monocyclic aromatic radical of 1 carbocyclic 6 membered ring having no more than the two substituents thereon, said substituents being selected from the group consisting of alkyl, alkoxy, halo, nitro and dialkylamino.

7. A composition of matter comprising a polymeric organic material selected from the group consisting of a vinyl chloride polymer, a cellulosic, a polystyrene, a polyamide and a polyester containing from about 0.01% to 10% by weight based on the total weight of said material of 1-cyanoformimidic acid, benzylidine hydrazide.

8. A composition of matter comprising a polymeric organic material selected from the group consisting of a vinyl chloride polymer, a cellulosic, a polystyrene, a polyamide and a polyester containing from about 0.01% to 10% by weight based on the total weight of said material of 1-cyanoformimidic acid, p-chlorobenzylidine hydrazide.

9. A composition of matter comprising a polymeric organic material selected from the group consisting of a vinyl chloride polymer, a cellulosic, a polystyrene, a polyamide and a polyester containing from about 0.01% to 10% by weight based on the total weight of said material of 1-cyanoformimidic acid, p-methylbenzylidine hydrazide.

References Cited in the file of this patent
UNITED STATES PATENTS

| | | |
|---|---|---|
| 2,353,690 | Clarkson | July 18, 1944 |
| 2,551,786 | Biswell | May 8, 1951 |